Figure 1:
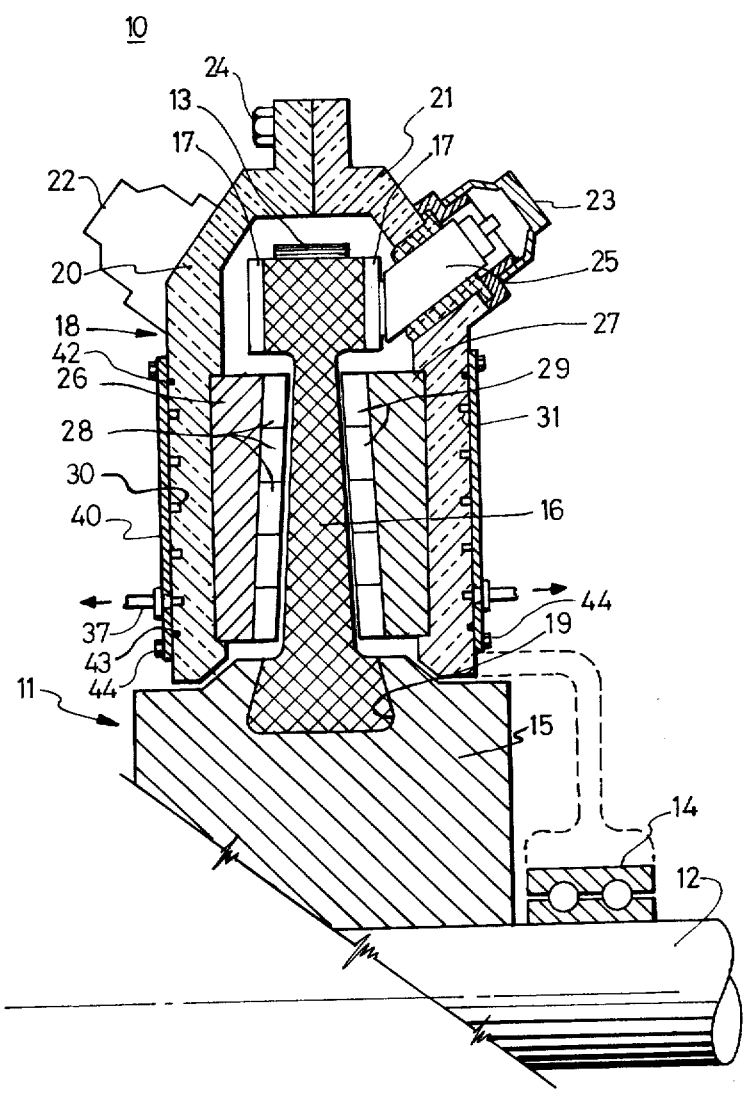

United States Patent [19]

Whiteley

[11] 4,190,780
[45] Feb. 26, 1980

[54] LIQUID COOLED DISC MACHINES

[75] Inventor: Eric Whiteley, Peterborough, Canada

[73] Assignee: Canadian General Electric Company Limited, Toronto, Canada

[21] Appl. No.: 853,180

[22] Filed: Nov. 21, 1977

[30] Foreign Application Priority Data

Dec. 30, 1976 [CA] Canada ................... 268889

[51] Int. Cl.$^2$ ............................. H02K 5/20
[52] U.S. Cl. ...................... 310/59; 310/64; 310/268
[58] Field of Search ........... 310/54, 154, 268, 64, 310/58, 59, 55, 60, 89, 52, 42

[56] References Cited

U.S. PATENT DOCUMENTS

| | | | |
|---|---|---|---|
| 3,260,872 | 7/1966 | Potter | 310/54 |
| 3,445,691 | 5/1969 | Beyersdorf | 310/268 |
| 3,469,134 | 9/1969 | Beyersdorf | 310/268 |
| 3,484,636 | 12/1969 | Parker | 310/268 |
| 3,699,370 | 10/1972 | Caldwell | 310/268 |
| 4,020,372 | 4/1977 | Whiteley | 310/268 |
| 4,059,777 | 11/1977 | Whiteley | 310/64 |

*Primary Examiner*—R. Skudy
*Attorney, Agent, or Firm*—Raymond A. Eckersley

[57] ABSTRACT

A cooling system for an axial air gap dynamoelectric machine having a discoidal rotor provides liquid cooling to the stator or rotor or both. The cooling system is arranged so that removal of a few parts will either expose the length of the liquid conducting passages or expose the end of a straight liquid conducting portion of a passage so that the cooling passages may be easily cleaned. In one form for stator cooling there are grooves in the outer wall of the stator with a cover plate over the grooves to form passages. An inlet and an outlet are provided in the cover plate. Removal of the cover plate exposes the groove for cleaning. In another form for rotor cooling the discoidal rotor has a metallic hub with pairs of straight holes extending through the hub generally parallel to the axis of rotation. A hub ring on one side of the hub has short grooves, forming with the hub, passages connecting each pair of straight holes. An end plate on the other side of the hub has two radially extending holes. One of these communicates with one of the straight holes in one pair and the other with an adjacent straight hole in an adjacent pair. This end plate also has grooves, forming with the hub passages which interconnect a straight hole with an adjacent straight hole in an adjacent pair of holes. This forms a continuous cooling passage from one of the radially extending holes to the other. A rotating union provides a connection for introducing a cooling liquid to one radially extending hole and removing the liquid from the other.

10 Claims, 9 Drawing Figures

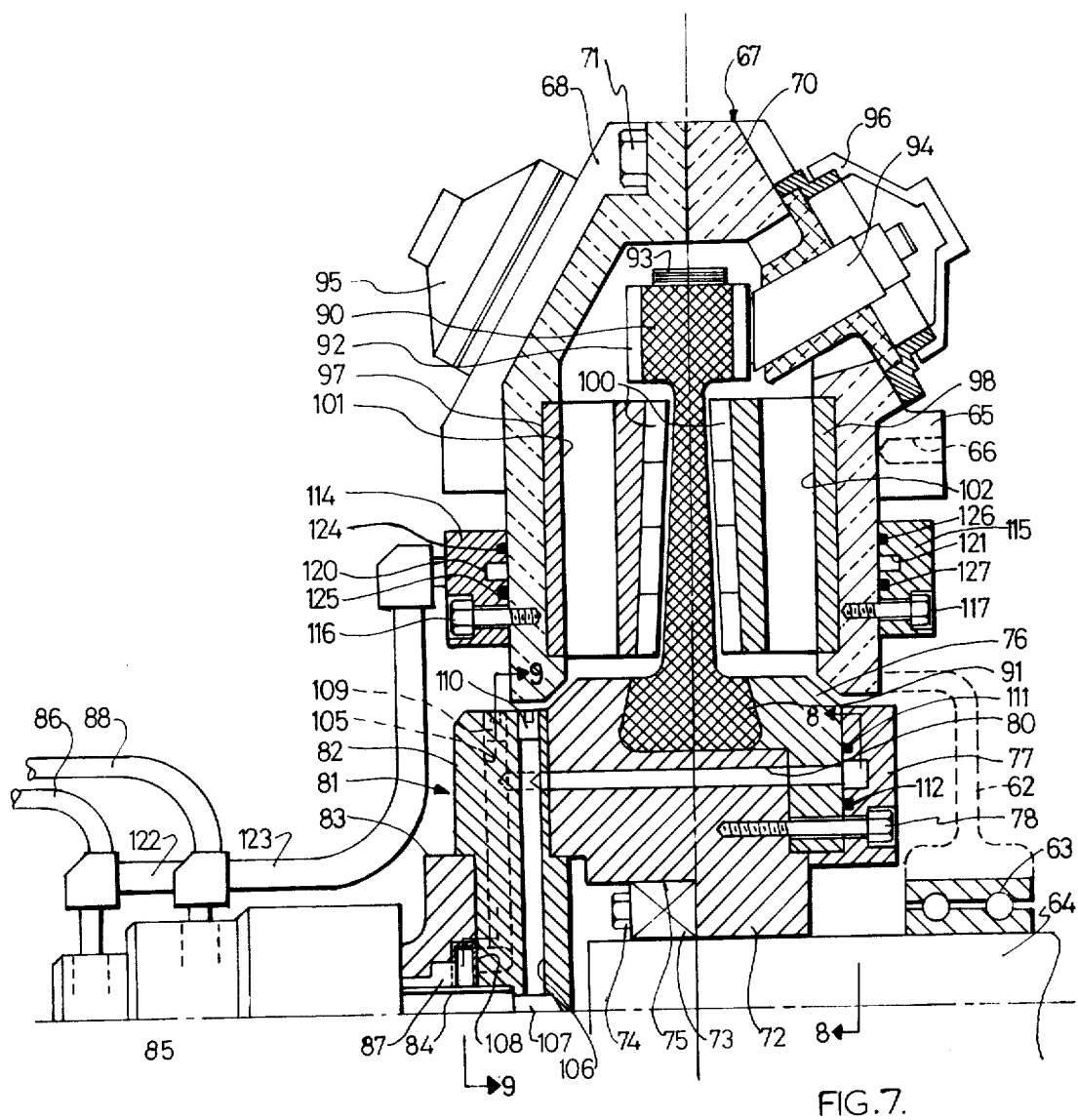
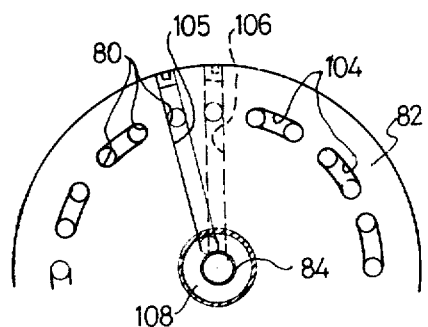
FIG 9
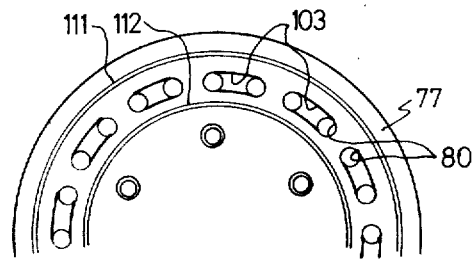
FIG 8

LIQUID COOLED DISC MACHINES

This invention relates to a cooling system for an axial air gap dynamoelectric machine having a discoidal rotor.

Machines of this type have a discoidal or discshaped rotor which rotates between two generally disc shaped stators. The magnetic field extends in an axial direction across the air gap between the rotor and at least one stator. The magnetic field is preferably provided by permanent magnets.

One advantage of axial air gap dynamoelectric machines having discoidal rotor is that they are quite compact. For example, such a machine having a rare earth permanent magnet field may typically have a volume which is, depending on rating, as little as one quarter the volume of a conventional dynamoelectric machine of comparable horsepower. While this is a considerable advantage, it requires greater attention to cooling.

In the past, axial air gap dynamoelectric machines of this type were generally of smaller power ratings and cooling was not a major concern. The cooling was readily accomplished by the circulation of air. However, as the machines were made in larger sizes, cooling by air became more difficult.

In the air cooling of these machines, the heat losses in the rotor are conveyed by air circulation to the stator structures, and this heat must then pass through the stator to be dissipated in external air. To obtain this heat flow, the temperature on the surface of the rotor disc must be higher than the temperature of the air inside the machine. In turn, the internal air temperature must be higher than the average stator temperature. The outside surface of the stator must in turn be higher than the external air temperature. There is a limit to the temperature to which the rotor can rise because of the temperature limitations of the materials, for example insulating materials, to obtain a desired lifetime for the machine. This places a limit on the design loading of the machine and/or on the ambient temperature at which it can operate.

It is, of course, known to use liquid cooling in other types of dynamoelectric machines. Cooling the stator structures by a liquid at the same temperature as the ambient air temperature can be more efficient, that is it can maintain the stator at a lower temperature than the circulation of ambient air. This will improve the heat flow and enable the rotor to carry a greater load. The liquid cooling of the rotor directly would, of course, also increase the load that could be carried. In addition lowering the temperature of the liquid will, of course, improve the cooling and increase the load that could be carried.

In the liquid cooling of dynamoelectric machines generally there are difficulties in locating the cooling passages to provide efficient cooling without adversely affecting the electrical and mechanical design. This is particularly so in disc type machines. Also, in any liquid cooled machine there is a problem in arranging for convenient cleaning of the liquid passages. If the liquid cooling system is a closed system it is possible to use cooling liquids that have no chemically active contaminants and no substances that will deposit on the walls of the liquid passages. However closed systems with special cooling liquids are expensive. A simple water cooled system, on the other hand, is relatively inexpensive but can result in deposits on the walls of liquid conducting passages. The deposits must then be removed periodically and this may be difficult depending on the size and configuration of the passages.

It is a feature of the present invention to provide a cooling system, for an axial air gap dynamoelectric machine, which is efficient and provides for convenient cleaning of the liquid passages.

In one form of the present invention there is provided a cooling system for an axial air gap dynamoelectric machine having a discoidal rotor and at least one stator, comprising a plate having one surface conforming to an exterior portion of surface of said stator, a groove in one of said plates and said exterior portion of surface of said stator forming a passageway when said plate is in engagement with said stator, means for removably securing said plate to said stator whereby removal of said plate exposes said groove for cleaning, inlet and outlet means communicating with said passageway, and means for introducing a cooling liquid through said inlet means and conducting it from said outlet means.

In another form there is provided a cooling system for an axial air gap dynamoelectric machine having a discoidal rotor including a hub and at least one stator, comprising at least one pair of straight bores extending through said hub from one side to the other, an end plate mounted to one side of said hub having a first and a second radially extending passage each closed at the radially outer end thereof and a first and second transverse passage each respectively communicating with the radially inner end of said first and second radially extending passages, first and second connecting passages respectively extending from and communicating with said first and second bores adjacent said radially outer end to one of said straight bores, a hub ring mounted to the other side of said hub and having groove means forming with said hub a passage means communicating with said bores and forming therewith a continuous passageway from said first transverse passage to said second transverse passage, and rotating union means connecting a liquid source to said first transverse passage and connecting a liquid outlet to said second transverse passage.

Figure 2:
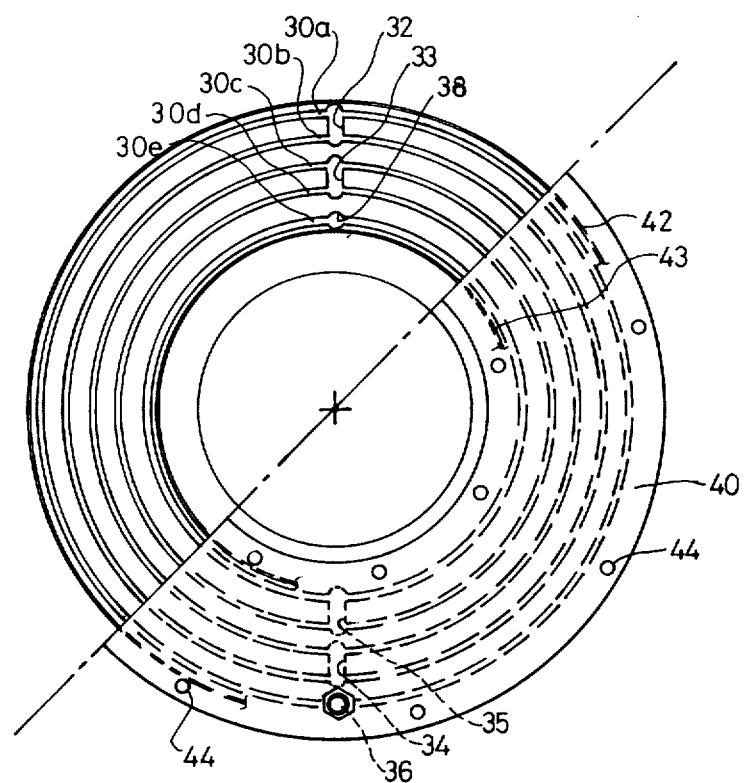
Figure 3:
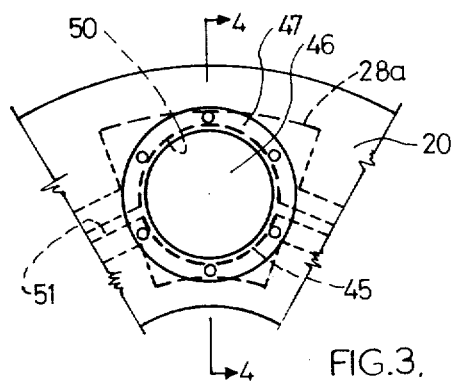
Figures 4, 6:
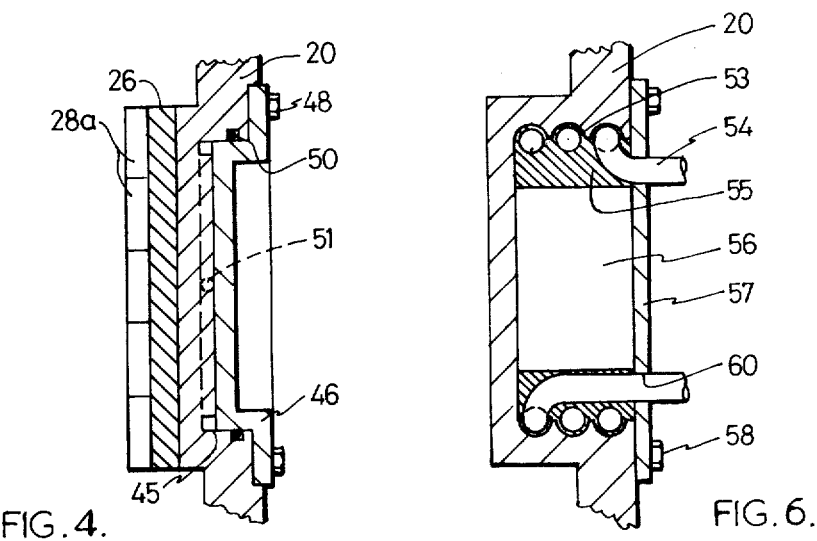
Figure 5:
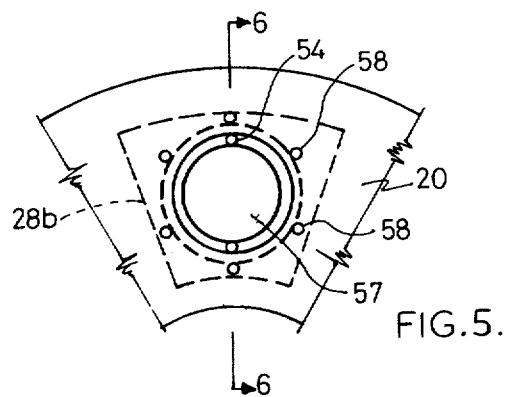

The invention will be described with reference to the accompanying drawings, in which FIG. 1 is a partial sectional view through a disc motor having a cooling system according to one form of the invention;

FIG. 2 is a side view of a portion of the motor of FIG. 1, with a cover plate partially removed to show the underlying liquid cooling passages, FIG. 3 is a partial side view of a disc motor having a cooling system according to another form of the invention, FIG. 4 is a sectional view taken along lines 4—4 of FIG. 3, FIG. 5 is a partial side view of a disc motor having a cooling system according to another form of the invention, FIG. 6 is a sectional view taken along line 6—6 of FIG. 5, FIG. 7 is a partial sectional view of a disc motor having a cooling system according to another form of the invention, FIG. 8 is a partial sectional view taken along line 8—8 of FIG. 7, and FIG. 9 is a partial sectional view taken along line 9—9 of FIG. 7.

The invention relates to a cooling system for an axial air gap dynamoelectric machine, and it can be applied with equal facility to AC machines or DC machines and to motors or generators. In the following description the embodiments or forms of the invention are described largely in connection with DC machines and frequently with reference to motors. It will, however, be apparent that the cooling system could be used with any axial air gap, disc type, dynamoelectric machine.

Referring now to FIG. 1, there is shown a sectional view of an upper (as it appears in FIG. 1) part of a DC disc machine 10 having a cooling system according to a form of the invention. A rotor 11 is mounted to a shaft 12 for rotation in bearings 14. The rotor 11 includes a hub 15 and a disc winding 16 secured to the hub 15. The disc winding 16 may, for example, be molded into a peripheral slot 19 in the hub where the slot has an outer opening smaller than its base, as shown. One type of winding suitable for the invention is described, for example, in Canadian Pat. No. 990,773 to Whiteley, issued June 8, 1976 to Canadian General Electric Company Limited. The winding comprises a number of coils bonded together or cast in a resinous material, for example an epoxy resin to provide a rigid discoidal rotor. An annular array of commutator segments 17 are provided on each side of the rotor, preferably adjacent the periphery as shown, and these segments 17 form part of the unitary structure. A band 13 of reinforcing material is bonded to the periphery of the rotor. The band 13 is conveniently of layers of tape having glass fibers extending around the periphery and bonded thereto.

A stator housing 18 has two generally disc-like or dish-like housing members 20 and 21 which include respectively, covers 22 and 23 for the brush gear. The two housing members 20 and 21 are fastened together by bolts 24. The brush gear mounted in housing member 21 can be seen in FIG. 1 and is indicated by the designation 25.

In disc machines the axial length of the machine is quite small as compared to standard dynamoelectric machines. This is a considerable advantage. Because the axial length is short, it is possible to arrange a disc machine so it can be mounted on a piece of associated equipment and make use of the bearings in the associated equipment to support the rotor of the disc machine. That is, a disc machine can be designed so that its rotor can be mounted on the projecting shaft of the machine to which it is to be coupled, and then the casing of the disc machine bolted to the casing of the machine to which it is to be coupled. The disc machine must, of course, be designed with this in mind. Also, because of the short axial length, it is convenient to couple two disc machines together using a common shaft. It is to permit such arrangements that brush covers 22 and 23 are offset from one another and the brush gear 25 is inclined. While this does not form part of the present invention, reference is included to explain the inclined, offset, brushes as seen in FIG. 1.

Mounting members 26 and 27, preferably of mild steel, are secured or fastened to housing members 20 and 21 respectively. Permanent magnets 28 and 29 are mounted opposite one another to mounting members 26 and 27. The permanent magnets 28 and 29 form the poles of the machine and any number of magnets can be used for each pole. The machine field extends between the poles, that is it extends between magnets 28 and 29 through winding 16 as shown, and there may be any desired even number of oppositely located poles. It will be seen that the field is substantially parallel to the axis of shaft 12 and thus the machine is an axial air gap machine. The mounting members 26 and 27 provide a magnetic path for the magnetic field circuit.

The description thus far has related to a disc type DC machine and will provide the necessary background for an understanding of the subsequent description relating to the cooling system.

The cooling system as shown in FIG. 1 includes a series of grooves 30 in housing member 20 and a series of grooves 31 in housing member 21. A plate 40 is bolted to housing member 20 covering grooves 30 to form passages or channels of the grooves and a plate 41 is bolted to housing member 21 covering grooves 31 in a similar manner. The grooves are similar in both housing members and the following description will refer only to grooves 30 and the associated apparatus.

Referring now to FIG. 2, there are five concentric circular grooves 30a, 30b, 30c, 30d and 30e. Considering the stator rings as being half on each side, the grooves 30a and 30b are joined by a channel 32 and the grooves 30c and 30d are joined by a channel 33 on one side. The grooves 30d and 30c are joined by a channel 34 and the grooves 30d and 30e are joined by a channel 35 on the other side. There is an inlet 39 through a cover plate 40 which communicates with groove 30a at 36, and there is an outlet 37 (FIG. 1) through plate 40 which communicates with groove 30e at 38. It will be seen that a liquid introduced through the inlet at point 36 will be conducted in both directions in the passage formed by groove 30a and the covering plate 40 to channel 32 and thence through the passage formed by groove 30b and plate 40, channel 34, the passage formed by groove 30c and plate 40, channel 33, the passage formed by groove 30d and plate 40, channel 35, and the passage formed by groove 30e and plate 40 to point 38 and outlet 37 (FIG. 1).

Referring to both FIGS. 1 and 2, the passages formed by grooves 30 and 31 with cover plates 40 and 41 respectively, conduct a cooling liquid to the stator which removes heat for improved operation of the machine. When plates 40 and 41 are removed, all the grooves 30 and 31 are exposed for easy cleaning. There are no closed passages which are difficult to clean, and in particular there are no closed curved passages. An outer and an inner O-ring seals 42 and 43 surround the cooling passages formed by grooves 30. Similarly seals 42 and 43 surround the passages formed by grooves 31. Machine screws 44 hold the cover plates 40 and 41 to the casing.

In smaller machines, that is in machines having a smaller diameter (and normally a smaller power rating), the design as indicated in FIGS. 1 and 2 is quite suitable. However, when larger diameter machines are required for larger power ratings, then it is convenient to use a segmented structure. In such a structure each side has a plurality of segments that can be bolted together to form the machine. It is convenient to make the segments of a size that will include one pole, although this is not essential and will depend on the number of poles. When a segmented structure is used, it is not possible or is very difficult to have grooves in the form of continuous circles as in FIGS. 1 and 2. Therefore alternate forms of passages are required and some suitable forms will now be described.

Referring now to FIGS. 3 and 4, thereis shown a portion of casing 20 which lies outside and adjacent to one of the poles of the machine as represented by magnets 28a. The casing 20 has a circular depression that is substantially centered with respect to the pole. A groove 45 in the casing 20 at the bottom of the depression extends around the periphery of the bottom of the depression. A formed cover plate 46 fits into the circular depression to cover groove 45 and thereby closing groove 45 to form a passage. The plate 46 has a laterally extending flange 47 which extends over casing 20 and machine screws 48 or the like secure the cover plate 46 to the casing 20. A groove 50 in the wall of the depression in casing 20 contains a seal to prevent leakage of liquid from closed groove 45. Laterally extending passages 51 extend from groove 45 through the casing 20 to communicate with a corresponding groove in the depression behind the adjacent pole. The passages conduct a cooling liquid through the casing to cool the portion behind each pole.

When it is desirable to clean the liquid conducting passages, cover plates 46 are removed to expose grooves 45 which can then be cleaned. The lateral passages 51 must be cleaned from the ends which open into the grooves 45. While the lateral passages 51 are not exposed, the passages are straight and uninterrupted and are relatively short. They can be cleaned with little difficulty.

Referring now to FIGS. 5 and 6, there is shown a form or embodiment of the invention where the cooling liquid is carried in a replaceable conduit. Casing 20 has a cylindrical depression behind a pole represented by permanent magnets 28b. A spiral groove 53 is on the inside surface of the cylindrical depression. A conduit 54 of flexible material, such as thin-walled copper or plastic tubing is positioned in groove 53. A metal matrix 55 which has a low melting point and a high heat conductivity, fills the space around conduit 54 and between conduit 54 and a central metal plug 56. A metal cover plate 57 covers the entire depression and has holes 60 for the conduit 54. The plate 57 is fastened to casing 20 by machine screws 58.

When assembling a cooling coil and associated apparatus of FIGS. 5 and 6, the conduit 54 is coiled, inserted in the depression and partially uncoiled to make it move outwardly into groove 53. The metal matrix 55 is added and steel plug 56 inserted. Metal matrix 55 is of a material that has good heat conductivity. If conduit 54 is a copper tube, then for example, matrix 55 could be a type of solder. If conduit 54 is plastic tube, then matrix 55 could be a resinous material with a high metal content. Excess matrix 55 is removed and cover plate 57 is mounted. The ends of conduit 54 are then coupled to the liquid circulating system.

Referring now to FIGS. 7, 8 and 9 there is shown a DC dynamoelectric disc machine where both rotor and stator have a liquid cooling arrangement. As mentioned previously, the machine may include a casing portion 62 with bearing 63 as indicated in FIG. 7 by broken lines. However the disc machine may be designed to have the rotor mounted to a shaft 64 of a machine to which it is to be coupled and the casing 67, the dynamoelectric disc machine of FIG. 7, may include mounting pads 65 each with a threaded hole 66 to receive a stud or the like for mounting casing 67 to the machine to which the disc machine is to be coupled. The disc machine will then not require internal bearings because it makes use of the bearings of the coupled machine.

To facilitate assembly of the disc machine of FIGS. 7, 8 and 9, the casing 67 is split and is formed of casing parts 68 and 70 held together by a series of large machine screws or bolts 71 spaced around the periphery of the casing. The rotor has a main hub portion 72 which is mounted to the end of shaft 64 by an expanding ring 73 which is expanded by rotation of screw 74 to engage the shaft 64 and an inner surface 75 of main hub portion 72. An auxiliary hub portion 76 and a hub ring 77 are mounted to the main hub portion 72 by means of screws 78. A number of straight cylindrical bores 80 extend through main hub portion 72 and auxiliary hub portion 76 as will be explained in more detail hereinafter.

Mounted to the other side of main hub portion 72 is an inlet-outlet assembly 81 having an end plate 82 a coupling ring 83 and a central tubular member 84 which define passages as will be described in more detail hereinafter. The tubular member 84 and coupling ring 83 extend into rotating union 85 of a type commercially available, for example, a DEU-PLEX model 2520 made by the Deublin Company of Northbrook, Ill., U.S.A. A rotating union of this type is able to couple a source of liquid from an inlet 86 into tubular member 84, and to couple an outlet passageway 87 defined by the outside of tubular member 84 and coupling ring 83 to an outlet 88.

A disc winding 90 is mounted to the hub structure of the rotor, for example by having a base 91 with sloping sides extending outwardly towards the center of the rotor, to engage mating sloped surfaces on main hub portion 72 and auxiliary hub portion 76. The winding 90 is preferably a number of coils bonded together or cast in a resinous material, for example an epoxy resin, to provide a rigid discoidal rotor. An annular array of commutator segments 92 are provided on each side of the winding 90, as in the FIG. 1 structure. Also, a band 93 of reinforcing material is bonded to the periphery of the rotor.

Brush gear 94 is provided for each side of the rotor to engage commutator segments on the respective side. Only the brush gear in casing part 70 is seen in FIG. 7. Covers 95 and 96 on casing parts 68 and 70 respectively are provided for the brush gear. As was discussed in connection with FIG. 1, each brush gear on one side is inclined in one direction and each brush gear on the other side is inclined in the other direction to provide for easy replacement of brushes when the disc machine is mounted in close proximity to another machine. The brush gear covers are, as a result, staggered around the casing.

Mounting members 97 and 98, preferably of steel, are spaced around the casing parts 68 and 70 opposite one another whenever a pole is located, and permanent magnets 100 are mounted to each mounting member to form the poles of the machine. This arrangement is the same as that described in connection with the FIG. 1 machine.

In FIG. 7 each mounting member 97 and 98 is provided with a plurality of radially extending passages 101 and 102 respectively to assist in the circulation of air within the enclosed machine. The passages also increase the surface exposed to the air within the machine to aid in transfer of heat to the casing and its subsequent removal.

Now to discuss in more detail the cooling of the rotor, it has been found that a considerable portion of generated heat is transmitted to the rotor hub which is metal and may be considered as a heat sink. A plurality of straight bore holes or straight passages 80 extend through the hub. That is the passages 80 extend through main hub portion 72 and auxiliary hub portion 76. The hub ring 77 has a series of short depressions or groove portions 103 as are perhaps best seen in FIG. 8. These groove portions extend from one passage 80 to an adjacent passage 80. Grooves 111 and 112 hold O-ring seals to prevent liquid leakage. Similarly, end plate 82 has a series of short depressions or groove portions 104 as are perhaps best seen in FIG. 9. The groove portions 104 extend from one passage 80 to an adjacent passage 80. In addition, end plate 82 has two radially extending bore holes or passages 105 and 106. The passage 106 terminates in a central space 107 which communicates with the central passage defined by tubular member 84. The passage 105 terminates in an annular space 108 which communicates with outlet passage 87. The outer ends of the passages 105 and 106 are threaded to receive plugs 109 and 110 respectively. A short connecting passage just inboard of the plugs 109 extends from passage 105 to one of the bores 80 and another short passage just inboard of plug 110 extends from passage 106 to an adjacent one of bore holes 80. It will be seen that there is a continuous liquid passage from inlet 86 through the rotating union 85, the central passage defined by tubular member 84, central space 107, radial passage 106, the bore 80 which communicates with radial passage 106, then a series of groove portions 103 to bore 80 to groove portion 104 around the hub ending in radial passage 105, annular space 108, outlet passageway 87, through rotating union 85 to outlet 88. This provides the direct liquid cooling of the rotor. The removal of hub ring 77 and end plate 82 will expose passages 80 for cleaning. These passages are straight. It will also expose groove portions 103 and 104. Removal of plugs 109 and 110 will expose radial passages 105 and 106, which are straight passages, for cleaning.

The cooling of the stator is provided by annular plates 114 and 115 on either side of the casing, that is plate 114 is held against the surface of casing part 68 by screws or bolts 116 and plate 115 is held against the surface of casing part 70 by screws or bolts 117. The annular plates 114 and 115 have grooves 120 and 121 respectively which extend substantially, but not completely, all the way around the respective annular plate. An inlet conduit 122 is coupled to plate 114 to communicate with one end of groove 120, and an outlet conduit 123 is coupled to plate 114 to communicate with the other end of groove 120. When plate 114 is clamped to casing part 68, groove 120 forms a passageway extending substantially around the casing with an inlet and outlet to provide liquid flow therethrough. The inlet and outlet are not shown for annular plate 115 but the arrangement is the same as for plate 114. Grooves 124 and 125 in plate 114 and grooves 126,127 in plate 115 contain O-ring seals. This arrangement provides cooling for both sides of the casing. Removal of annular plates 114 and 115 expose grooves 120 and 121 for cleaning.

The cooling system according to the invention provides for liquid cooling of a stator and for the rotor of an axial air gap machine where the passages conducting the cooling liquid are readily exposed for cleaning by removal of an ancillary part or the passages are straight passages that may be opened at one end or both ends for cleaning.

What I claim as new and desire to secure by Letters Patent of the United States is:

1. A cooling system for an axial air gap dynamoelectric machine having a discoidal rotor and at least one stator, comprising
   a plate having one surface conforming to an exterior portion of surface of said stator,
   a groove in said exterior portion of surface of said stator forming a passageway when said plate is in engagement with said stator,
   means for removably securing said plate to said stator whereby removal of said plate exposes said groove for cleaning,
   inlet and outlet means communicating with said passageway, and
   means for introducing a cooling liquid through said inlet means and conducting it from said outlet means.

2. A cooling system as defined in claim 1 in which there are two generally discoidal stator parts, one on each side of said rotor and in which there is one said plate for the exterior surface of each stator part.

3. A cooling system as defined in claim 2 in which each said plate is annular and positioned with its center coincident with the axis of the rotor shaft.

4. A cooling system as defined in claim 1 and further including a sealing ring around the periphery of each said plate for making sealing engagement with said stator.

5. A cooling system as defined in claim 1, and further comprising a tube lining said passageway, said tube being replaceable.

6. A cooling system as defined in claim 1 in which said rotor includes a hub mounted on a shaft and further comprising
   at least one pair of straight bores extending through said hub from one side to the other,
   an end plate mounted to one side of said hub having a first and a second radially extending passage each closed at the radially outer end thereof and a first and second transverse passage each respectively communicating with the radially inner end of said first and second radially extending passages,
   first and second connecting passages respectively extending from and communicating with said first and second bores adjacent said radially outer end to one of said straight bores,
   a hub ring mounted to the other side of said hub and having groove means forming with said hub a passage means communicating with said bores and forming therewith a continuous passageway from said first transverse passage to said second transverse passage, and
   rotating union means connecting a liquid source to said first transverse passage and connecting a liquid outlet to said second transverse passage.

7. A cooling system for an axial air gap dynamo-electric machine having a discoidal rotor and at least one stator, comprising
   at least one liquid carrying groove in said stator on an external surface thereof,
   a cover plate extending over said groove, closing said groove to form a passageway,
   means for removably securing said cover plate to said stator whereby removal of said cover plate exposes said liquid carrying groove for cleaning,
   said cover plate having an inlet opening and an outlet opening extending therethrough communicating with said passageway, and
   means for introducing a cooling liquid through said inlet and conducting it from said outlet.

8. A cooling system for an axial air gap dynamoelectric machine having a discoidal rotor including a hub and mounted on a shaft, and at least one stator, comprising an end plate removably mounted to a first side of said hub for rotation therewith and having a first and a second adjacent, radially extending, passage, said first passage terminating in a central space and said second passage terminating in an annular space separate from said central space, a rotating union having liquid conducting inlet and outlet means coupled with said central space and said annular space, plug means closing the outer ends of said first and second passages, said hub being provided with a plurality of pairs of straight bores, spaced around said hub and extending parallel to the axis of said rotor, a pair of bores being two adjacent bores, third and fourth passages in said end plate each coextensive with a respective straight bore in a first pair of straight bores and communicating therewith and with a respective one of said first and second passages, said end plate being provided with a grooved portion extending between the bores in each pair of straight bores other than said first pair of straight bores, forming a passage therebetween, a hub ring removably mounted to a second side of said hub, opposite said first side thereof and having a number of groove portions the same as the number of said pairs of bores, said hub ring being positioned so that each groove portion therein extends between adjacent straight bores in adjacent pairs of straight bores, forming a passage between the respective adjacent straight bores, said passages in said end plate and said hub ring together with said straight bores, forming a continuous passage for liquid between said central space and said annular space, removal of said end plate, said hub ring and said plug means exposing said passages for cleaning.

9. A cooling system as defined in claim 8 and further including a sealing ring around said hub ring outwardly of and inwardly of said groove portions in said hub ring.

10. A cooling system for an axial in gap dynamoelectric machine having a discoidal rotor including a hub and at least one stator, comprising at least one pair of straight bores extending through said hub from one side to the other, an end plate mounted to one side of said hub having a first and a second radially extending passage each closed at the radially outer end thereof and a first and second transverse passage each respectively communicating with the radially inner end of said first and second radially extending passages, first and second connecting passages respectively extending from and communicating with said first and second bores adjacent said radially outer end to one of said straight bores, a hub ring mounted to the other side of said hub and having groove means forming with said hub a passage means communicating with said bores and forming therewith a continuous passageway from said first transverse passage to said second transverse passage, and rotating union means connecting a liquid source to said first transverse passage and connecting a liquid outlet to said second transverse passage.

* * * * *